United States Patent
Koka et al.

(10) Patent No.: US 8,565,608 B2
(45) Date of Patent: Oct. 22, 2013

(54) OPTICAL NETWORK WITH SWITCHABLE DROP FILTERS

(75) Inventors: Pranay Koka, Austin, TX (US); Michael O. McCracken, Austin, TX (US); Herbert D. Schwetman, Jr., Austin, TX (US); Xuexhe Zheng, San Diego, CA (US); Ashok V. Krishnamoorthy, San Diego, CA (US)

(73) Assignee: Oracle International Corporation, Redwood Shores, CA (US)

(*) Notice: Subject to any disclaimer, the term of this patent is extended or adjusted under 35 U.S.C. 154(b) by 266 days.

(21) Appl. No.: 13/180,355

(22) Filed: Jul. 11, 2011

(65) Prior Publication Data

US 2013/0016970 A1 Jan. 17, 2013

(51) Int. Cl.
*H04B 10/00* (2013.01)
*H04J 14/02* (2006.01)
*G02B 6/42* (2006.01)

(52) U.S. Cl.
CPC .................................. *G02B 6/4246* (2013.01)
USPC .............................. 398/139; 398/83; 398/164

(58) Field of Classification Search
USPC ............ 398/45, 48, 49, 82, 83, 164, 135, 139
See application file for complete search history.

(56) References Cited

U.S. PATENT DOCUMENTS

| | | | |
|---|---|---|---|
| 4,580,872 A | 4/1986 | Bhatt et al. | |
| 4,809,264 A | 2/1989 | Abraham et al. | |
| 5,541,914 A | 7/1996 | Krishnamoorthy et al. | |
| 5,602,663 A | 2/1997 | Hamaguchi et al. | |
| 5,742,585 A | 4/1998 | Yamamoto et al. | |
| 5,943,150 A | 8/1999 | Deri et al. | |
| 6,021,263 A | 2/2000 | Kujoory et al. | |
| 6,289,021 B1 | 9/2001 | Hesse | |
| 6,633,542 B1 | 10/2003 | Natanson et al. | |
| 6,665,495 B1 | 12/2003 | Aicklen et al. | |
| 6,873,796 B1 | 3/2005 | Nakahira | |
| 7,403,473 B1 | 7/2008 | Mehrvar et al. | |
| 7,490,189 B2 * | 2/2009 | Eberle et al. | 710/317 |
| 7,804,504 B1 | 9/2010 | Agarwal | |
| 8,340,517 B2 * | 12/2012 | Shacham et al. | 398/46 |
| 2003/0214962 A1 | 11/2003 | Allaye-Chan et al. | |

(Continued)

OTHER PUBLICATIONS

Chae, Chang-Joon, "Optical CSMA/CD Media Access Scheme for Ethernet Over Passive Optical Network", IEEE, 2002.

(Continued)

*Primary Examiner* — Dalzid Singh
(74) *Attorney, Agent, or Firm* — Park, Vaughan, Fleming & Dowler LLP; Steven E. Stupp (57) ABSTRACT

In a multi-chip module (MCM), integrated circuits are coupled by optical waveguides. These integrated circuits receive optical signals from a set of light sources which have fixed carrier wavelengths. Moreover, a given integrated circuit includes: a transmitter that modulates at least one of the optical signals when transmitting information to at least another of the integrated circuits; and a receiver that receives at least one modulated optical signal having one of the carrier wavelengths when receiving information from at least the other of the integrated circuits. Furthermore, the MCM includes switchable drop filters optically coupled to the optical waveguides and associated integrated circuits, wherein the switchable drop filters pass adjustable bands of wavelengths to receivers in the integrated circuits. Additionally, control logic in the MCM provides a control signal to the switchable drop filters to specify the adjustable bands of wavelengths.

20 Claims, 5 Drawing Sheets

(56) References Cited

U.S. PATENT DOCUMENTS

| | | |
|---|---|---|
| 2004/0037558 A1 | 2/2004 | Beshai |
| 2006/0007859 A1* | 1/2006 | Kadambi et al. .............. 370/229 |
| 2009/0046572 A1 | 2/2009 | Leung |
| 2011/0103799 A1 | 5/2011 | Shacham et al. |

OTHER PUBLICATIONS

Desai, B.N., "An optical implementation of a packet-based (Ethernet) MAC in a WDM passive optical network overlay", 2000 Optical Society of America.

Krishnamoorthy, Ashok, "Computer Systems Based on Silicon Photonic Interconnects", Proceedings of the IEEE, vol. 97, No. 7, Jul. 2009.

Qin, Xiangdong, "Nonblocking WDM Switching Networks With Full and Limited Wavelength Conversion", 2002 IEEE.

Shacham, Assaf, "On the Design of a Photonic Network-on-Chip", Proceedings of the First International Symposium on Networks-on-Chip, 2007, IEEE.

Antrease, Dana, "Corona: System Implications of Emerging Nanophotonic Technology", 2008, IEEE.

Wang, Howard, "Nanophotonic Optical Interconnection Network Architecture for On-Chip and Off-Chip Communications", OFC/NFOEC 2008.

Yang, Yuanyuan, "Designing WDM Optical Interconnects with Full Connectivity by Using Limited Wavelength Conversion", 2004 IEEE.

Battan, Christopher, "Building Manycore Processor-to-DRAM Networks with Monolithic Silicon Photonics", Proceedings of the 16th Symposium on High Performance Interconnects (HOT1-16), Aug. 2008.

* cited by examiner

```
┌─────────────────────────────────────────────────────────────┐
│  A CONTROL SIGNAL IS SELECTED BASED ON DESIRED COMMUNICATION │
│   BETWEEN AT LEAST A PAIR OF INTEGRATED CIRCUITS IN AN MCM   │
│                             510                              │
└─────────────────────────────────────────────────────────────┘
                              │
                              ▼
┌─────────────────────────────────────────────────────────────┐
│  THE CONTROL SIGNAL IS PROVIDED TO SWITCHABLE DROP FILTERS,  │
│ THEREBY SPECIFYING ADJUSTABLE BANDS OF WAVELENGTHS PASSED BY │
│  THE SWITCHABLE DROP FILTERS AND DEFINING ROUTING OF AT LEAST│
│  ONE OPTICAL SIGNAL IN AN MCM DURING COMMUNICATION BETWEEN   │
│            AT LEAST THE PAIR OF THE INTEGRATED CIRCUITS      │
│                             512                              │
└─────────────────────────────────────────────────────────────┘
```

FIG. 5

“Optical Network With Tunable Optical Light Sources,” by Pranay Koka, Michael O. McCracken, Herbert D. Schwetman, Jr., Xuezhe Zheng, and Ashok V. Krishnamoorthy, and filed 11 Jul. 2011, and to U.S. patent application Ser. No. 13/180,364 (published as U.S. Publication No. 2013/0016941), entitled "Arbitrated Optical Network Using Tunable Drop Filters," by Pranay Koka, Michael O. McCracken, Herbert D. Schwetman, Jr., Xuezhe Zheng, and Ashok V. Krishnamoorthy, and filed on 11 Jul. 2011, the contents of both of which are herein incorporated by reference.

US 8,565,608 B2

OPTICAL NETWORK WITH SWITCHABLE DROP FILTERS

GOVERNMENT LICENSE RIGHTS

This invention was made with Government support under Agreement No. HR0011-08-9-0001 awarded by DARPA. The Government has certain rights in the invention.

CROSS REFERENCE TO RELATED APPLICATIONS

This application is related to U.S. patent application Ser. No. 13/180,340 (published as U.S. Publication No. 2013/0016980), entitled "Optical Network With Tunable Optical Light Sources," by Pranay Koka, Michael O. McCracken, Herbert D. Schwetman, Jr., Xuezhe Zheng, and Ashok V. Krishnamoorthy, and filed 11 Jul. 2011, and to U.S. patent application Ser. No. 13/180,364 (published as U.S. Publication No. 2013/0016941), entitled "Arbitrated Optical Network Using Tunable Drop Filters," by Pranay Koka, Michael O. McCracken, Herbert D. Schwetman, Jr., Xuezhe Zheng, and Ashok V. Krishnamoorthy, and filed on 11 Jul. 2011, the contents of both of which are herein incorporated by reference.

BACKGROUND

1. Field

The present disclosure generally relates to optical networks. More specifically, the present disclosure relates to a multi-chip module (MCM) that includes integrated circuits that communicate via an optical network using statically tuned optical light sources and switchable drop filters.

2. Related Art

Wavelength division multiplexing (WDM), which allows a single optical link to carry multiple channels, can provide: very high bit-rates, very high bandwidth densities and very low power consumption. As a consequence, researchers are investigating the use of WDM to facilitate inter-chip communication. For example, in one proposed architecture chips (which are sometimes referred to as 'sites') in an array (which is sometimes referred to as an MCM or a 'macrochip') are coupled together by an optical network that includes optical interconnects (such as silicon optical waveguides).

In order to use photonic technology in interconnect applications, an efficient design is needed for the optical network. In particular, the optical network typically needs to provide: a high total peak bandwidth; a high bandwidth for each logical connection between any two sites in the array; low arbitration and connection setup overheads; low power consumption; and bandwidth reconfigurability.

Figure 1:
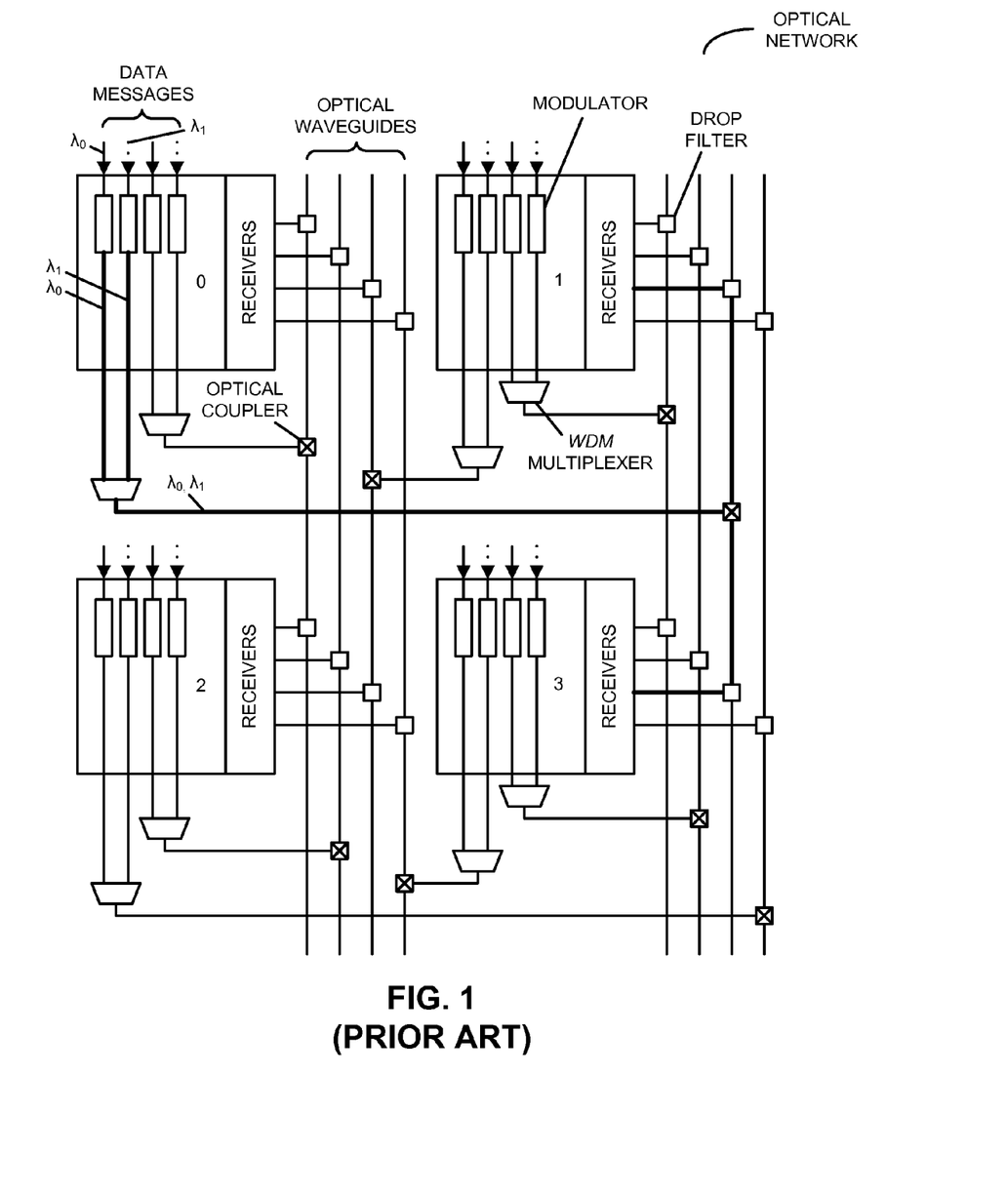
FIG. 1 is a block diagram illustrating an existing static point-to-point optical network.

A variety of network topologies having different characteristics and contention scenarios have been proposed to address these challenges in interconnect applications. One existing network topology, a static WDM point-to-point optical network, is shown in FIG. 1. In this network topology, an array of integrated circuits or chips 0-3 (which are each located at a 'site' in the array) are coupled by silicon optical waveguides using two carrier wavelengths (represented by the solid and dotted arrows). Note that the optical network in FIG. 1 is a fully connected point-to-point optical network. In particular, each site has a dedicated channel to every other site. Channels to all the sites in a column of the array (which are conveyed by different carrier wavelengths output by non-tunable light sources) may be multiplexed using WDM onto a single waveguide that runs from the source site and visits each site in the column, where a wavelength-selective 'drop filter' redirects one of the multiplexed wavelengths to a destination site (in this case, the drop filters in row 1 pick off the first carrier wavelength, and the drop filters in row 2 pick off the second carrier wavelength, so the carrier wavelength is used for routing). As illustrated by the bold line, in FIG. 1 chip 0 communicates with chips 1 and 3.

A key property of this optical network is the lack of arbitration overhead, which allows low minimum latency and high peak utilization for uniform traffic patterns. Furthermore, this optical network uses no switching elements, which results in low optical power loss in the optical waveguides. However, the bandwidth in the optical waveguides is statically allocated, which constrains the available bandwidth between any two sites. For example, in a macrochip that includes 64 chips arranged in an 8×8 array, with a peak system bandwidth of 20 TB/s, a total transmit bandwidth of 320 GB/s and a total receive bandwidth of 320 GB/s for each site, the bandwidth between any two sites is 5 GB/s, because each site has 64 outgoing optical waveguides so that each optical waveguide only has $1/64^{th}$ of the total site bandwidth. This constraint can lead to low performance for workloads that heavily stress a subset of the optical waveguides.

Other proposed network topologies have attempted to address this problem at the cost of: additional power consumption (such as that associated with switches), optical signal loss, increased area, constraints on the total transmit and receive bandwidths, constraints on the optical waveguide density, latency associated with setting up switches, and/or arbitration overhead associated with shared resources (which can be a performance bottleneck for workloads consisting of short messages). To date, the tradeoffs between the improved site-to-site bandwidth and the costs in these other approaches do not successfully address the challenges in implementing optical networks in interconnect applications.

Hence, what is needed is an MCM with an optical network that does not suffer from the above-described problems.

SUMMARY

One embodiment of the present disclosure provides an MCM. This MCM includes integrated circuits that receive optical signals from a set of light sources which have fixed carrier wavelengths. A given integrated circuit includes: a transmitter that modulates at least one of the optical signals when transmitting information to at least another of the integrated circuits; and a receiver that receives at least one modulated optical signal having one of the carrier wavelengths when receiving information from at least the other of the integrated circuits. Moreover, the MCM includes first optical waveguides, optically coupled to the integrated circuits, that convey modulated optical signals from transmitters in the integrated circuits, and second optical waveguides, optically coupled to the first optical waveguides, that convey the modulated optical signals. Furthermore, the MCM includes switchable drop filters optically coupled to the second optical waveguides and associated integrated circuits, where the switchable drop filters are configured to pass adjustable bands of wavelengths to receivers in the integrated circuits, and where a given adjustable band of wavelengths of a given switchable drop filter associated with the given integrated circuit includes one of: a given carrier wavelength and another wavelength (such as an unused carrier wavelength). Additionally, the MCM includes control logic that provides a control signal to the switchable drop filters to specify the adjustable bands of wavelengths, thereby defining routing of at least the one of the optical signals in the MCM during communication between at least a pair of the integrated circuits.

Note that the integrated circuits may be arranged in an array. The first optical waveguides may be optically coupled to rows in the array (or, more generally, a first direction in the array), and the second optical waveguides may be optically coupled to columns in the array (or, more generally, a second direction in the array).

Furthermore, the first optical waveguides and the second optical waveguides may be implemented in different layers on a substrate, and the MCM may include interlayer couplers that optically couple the first optical waveguides and the second optical waveguides. For example, the first optical waveguides and the second optical waveguides may be implemented on the substrate using silicon-on-insulator technology.

Moreover, the control signal may specify a number of switchable drop filters associated with the given integrated circuit that have adjustable bands of wavelengths that include carrier wavelengths, thereby specifying a bandwidth during communication between at least the pair of the integrated circuits.

Additionally, communication between the pair of integrated circuits may be contention free.

Another embodiment provides a system that includes: the set of light sources that output optical signals having fixed carrier wavelengths; and the MCM.

Another embodiment provides a method for routing optical signals in the MCM. During the method, a control signal is selected based on desired communication between at least the pair of integrated circuits in the MCM, which are optically coupled by optical waveguides, where the given integrated circuit modulates at least one of the optical signals having carrier wavelengths when transmitting information to at least another of the integrated circuits and receives at least one modulated optical signal having one of the carrier wavelengths when receiving information from at least the other of the integrated circuits. Then, the control signal is provided to switchable drop filters optically coupled to the optical waveguides and associated integrated circuits, thereby specifying adjustable bands of wavelengths passed by the switchable drop filters and defining routing of at least the one of the optical signals in the MCM during communication between at least a pair of the integrated circuits. Note that the switchable drop filters pass adjustable bands of wavelengths to receivers in the integrated circuits.

In some embodiments, the given integrated circuit receives up to all of the optical signals based on the control signal.

BRIEF DESCRIPTION OF THE FIGURES

Table 1 provides configuration information in an embodiment of an optical network in an MCM.

Note that like reference numerals refer to corresponding parts throughout the drawings. Moreover, multiple instances of the same part are designated by a common prefix separated from an instance number by a dash.

DETAILED DESCRIPTION

Embodiments of an MCM, a system that includes the MCM, and a method for routing optical signals in the MCM are described. In this MCM, integrated circuits are coupled by optical waveguides. These integrated circuits receive optical signals from a set of light sources which have fixed carrier wavelengths. Moreover, a given integrated circuit includes: a transmitter that modulates at least one of the optical signals when transmitting information to at least another of the integrated circuits; and a receiver that receives at least one modulated optical signal having one of the carrier wavelengths when receiving information from at least the other of the integrated circuits. Furthermore, the MCM includes switchable drop filters optically coupled to the optical waveguides and associated integrated circuits, wherein the switchable drop filters pass adjustable bands of wavelengths to receivers in the integrated circuits. Additionally, control logic in the MCM provides a control signal to the switchable drop filters to specify the adjustable bands of wavelengths, thereby defining routing of at least the one of the optical signals in the MCM during communication between at least a pair of the integrated circuits.

The optical network in the MCM provides a high, dynamically configurable, site-to-site bandwidth and has no contention among communicating integrated circuits. Moreover, access to this optical network does not require arbitration or any other form of contention resolution. Therefore, this optical network has a suitable balance of high bandwidth and low latency for use in interconnect applications.

Figure 2:
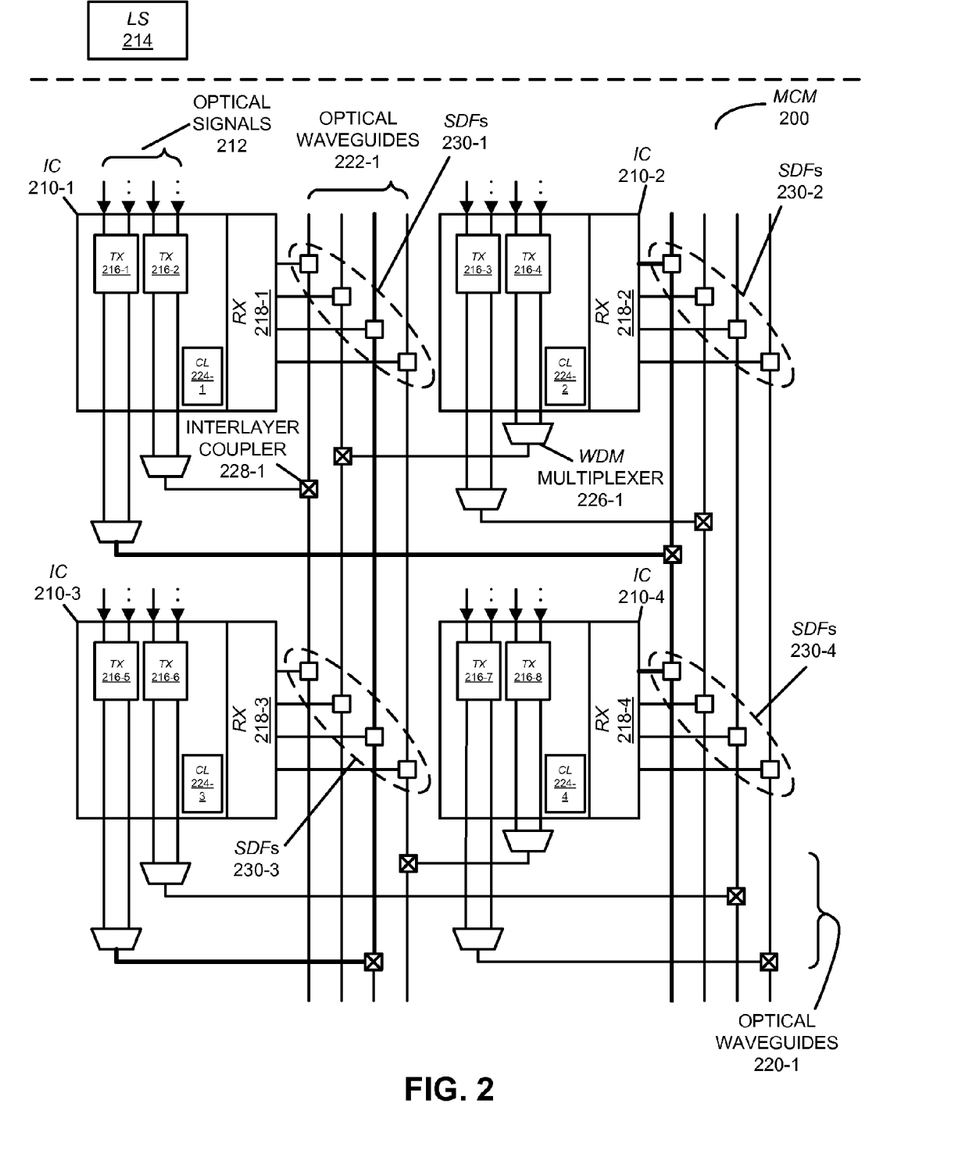
FIG. 2 is a block diagram illustrating optical communication in an MCM in accordance with an embodiment of the present disclosure.

We now describe embodiments of the MCM. FIG. 2 presents a block diagram illustrating optical communication in MCM 200 (which is sometimes referred to as a 'macrochip'). This MCM provides a contention-free network that uses optical signals having fixed carrier wavelengths (which are provided by statically tuned lasers) at the source and switchable drop filters at the destination (instead of switches) to route optical signals. Because of the use of shared optical waveguides between multiple destinations, the optical network in MCM 200 has a network topology with fewer parallel transfers that can be dynamically reconfigured to increase the site-to-site bandwidth. For example, bandwidth out of a site can be re-allocated among the sites in a destination column by: sending all carrier wavelengths to a single destination, spreading the carrier wavelengths evenly among the sites in the column, or any combination in between. (Thus, based on the workflow/application, a given integrated circuit in MCM 200 can be configured to communicate with the entire network as a point-to-point optical network, or parallel communication between the integrated circuits can be supported.)

In particular, MCM 200 includes integrated circuits (ICs) 210 (such as processors and/or memory chips) that receive optical signals 212 from a set of statically tuned light sources (LS) 214 (such as statically tuned lasers that output optical signals having fixed carrier wavelengths). This set of statically tuned light sources may be external to MCM 200 (as indicated by the dashed line), and may be optically coupled to MCM 200 by optical fiber(s). In this discussion, a statically tuned laser is a light source that outputs particular fixed wavelength(s) in the usable spectrum. A given integrated circuit in MCM 200 (such as integrated circuit 210-1) includes: a transmitter, such as transmitter (TX) 216-1, that modulates at least one of optical signals 212 when transmitting information to at least another of integrated circuits 210; and a receiver, such as receiver (RX) 218-1, that receives at least one modulated optical signal having one of the carrier wavelengths when receiving information from at least the other of integrated circuits 210.

Moreover, MCM 200 includes optical waveguides (such as optical waveguides 220-1), optically coupled to the integrated circuits 210 by WDM multiplexers (such as WDM multiplexers 226-1), that convey modulated optical signals from transmitters 216 in integrated circuits 210, and optical waveguides (such as optical waveguides 222-1), optically coupled to the other optical waveguides, that convey the modulated optical signals to switchable drop filters 230 or SDFs (which may include switchable add/drop filters). These switchable drop filters pass adjustable bands of wavelengths to receivers 218 in integrated circuits 210. In particular, a given adjustable band of wavelengths of a given switchable drop filter associated with the given integrated circuit includes one of: a given carrier wavelength and another wavelength (such as an unused carrier wavelength). Thus, the switchable drop filters may be dynamically tuned to be effectively 'off,' thereby allowing light to pass by it unchanged. Aside from minor power loss, a switchable drop filter does not interfere with other carrier wavelengths outside of the adjustable band of wavelengths.

Additionally, MCM 200 includes control logic 224 that provides one or more control signals to switchable drop filters 230 to specify the adjustable bands of wavelengths, thereby defining routing of at least the one of optical signals 212 in MCM 200 during communication between at least a pair of integrated circuits 210. (As noted previously, communication between the pair of integrated circuits or sites in MCM 200 may be contention free. Note that if sites A, B, C, and D are interconnected, and site A sending to site C blocks site B sending to site D, then the topology is 'blocking' However, if site A and site B contend to send to site C, there is contention but the network is not blocking.) In general, control logic 224 may be centralized or distributed in MCM 200. Note that the control signal may specify a number of switchable drop filters associated with the given integrated circuit that have adjustable bands of wavelengths that include carrier wavelengths, thereby specifying a bandwidth during communication between at least the pair of the integrated circuits.

As shown in FIG. 2, integrated circuits 210 may be arranged in an array. Some of the optical waveguides (such as optical waveguides 220-1) may be optically coupled to rows in the array (or, more generally, a first direction in the array), and the other optical waveguides (such as optical waveguides 222-1) may be optically coupled to columns in the array (or, more generally, a second direction in the array). Furthermore, in integrated circuits 210, the optical waveguides in the different directions may be physically separate components. For example, optical waveguides 220-1 and optical waveguides 222-1 may be implemented in different layers on a substrate (which eliminates waveguide crossings that can cause power loss and cross-talk problems), and MCM 200 may include interlayer couplers, such as interlayer coupler 228-1 (for example, an optical proximity connector) that optically couple the optical waveguides. Note that an interlayer coupler may transfer an optical signal in an optical waveguide in a layer to an optical waveguide in another layer that is vertically above or below the layer. Furthermore, in MCM 200 each horizontal optical waveguide is coupled to exactly one vertical optical waveguide.

The optical waveguides may be implemented in a semiconductor layer on the substrate, and the optical signals or light in these optical waveguides may be highly confined because of the big difference between the index of refraction of the semiconductor layer and the surrounding material. While a wide variety of materials can be used in the semiconductor layer, in an exemplary embodiment silicon is used. Furthermore, this silicon semiconductor layer may be disposed on a buried-oxide layer which, in turn, is disposed on the substrate. Once again, a wide variety of materials may be used in the substrate, such as a semiconductor, glass or plastic. In an exemplary embodiment, silicon is used in the substrate, along with silicon dioxide in the buried-oxide layer. Consequently, in some embodiments, the substrate, the buried-oxide layer and the semiconductor layer may comprise a silicon-on-insulator (SOI) technology.

In an exemplary embodiment, the optical waveguides convey optical signals (i.e., light) having wavelengths between 1.1-1.7 µm, such as an optical signal having a fundamental wavelength of 1.3 or 1.55 µm. These optical waveguides may have thicknesses between 0.25 and 3 µm, and widths between 0.5 and 3 µm. Note that because the optical waveguides may have quasi-rectangular cross-sections, they may be quasi-single mode components. Moreover, the buried-oxide layer may have a thickness between 0.3 and 3 µm.

In an exemplary embodiment, each optical waveguide in MCM 200 can carry two wavelengths of light (for example, red and green wavelengths). The horizontal optical waveguides may be fed by integrated circuits 210 using off-macrochip laser sources which are modulated, using transmitters 216 on these integrated circuits. Moreover, each vertical optical waveguide is an input optical waveguide to all the integrated circuits or sites in a column. Note that each of integrated circuits 210 may have two (and N, for an N×N macrochip) photo-detectors per optical waveguide (to potentially receive up to all of the carrier wavelengths in optical signals 212), which receive the light through a switchable drop filter. For example a switchable drop filter can be tuned to a green wavelength or some other wavelength which is not any of the other valid carrier wavelengths in the optical waveguide. When the switchable drop filter is tuned to a particular carrier wavelength, it extracts light of that carrier wavelength at the receiver. In FIG. 2, each of integrated circuits 210 may have two switchable drop filters on each optical waveguide. Hence, a given integrated circuit can receive all or a subset of the carrier wavelengths on each optical waveguide.

Note that each of integrated circuits 210 may have a statically assigned carrier wavelength on each optical waveguide, which is referred to as its 'primary wavelength.' In the default state, the given integrated circuit has the switchable drop filter of its primary wavelength in the 'ON' state and all other switchable drop filters on that optical waveguide in the 'OFF' state. In this discussion, an ON state is defined as the state in which the switchable drop filter is tuned-in to its assigned carrier wavelength. Moreover, an OFF state is defined as the state in which the switchable drop filter is tuned-out of its carrier wavelength. In FIG. 2, integrated circuit 210-1 may have a 'green' carrier-wavelength switchable drop filter in the ON state and a 'red' carrier-wavelength switchable drop filter in the OFF state on the first column optical waveguide. Similarly, integrated circuit 210-3 may have a 'green' carrier-wavelength switchable drop filter in the OFF state and a red carrier-wavelength switchable drop filter in the ON state on the first column optical waveguide. In general, the given receiving integrated circuit always tunes its switchable drop filters to the default state unless signaled by a transmitting integrated circuit. This default state is used to control switchable drop filters along the path of a transmission.

During operation of MCM 200, each of the vertical optical waveguides and its corresponding horizontal optical waveguide may be sourced with one or more modulated optical signal(s) from a single one of integrated circuits 210 but received by all the integrated circuits in a column. This optical waveguide is sometimes referred to as a 'shared data channel.' Because two of integrated circuits 210 cannot transmit into a common optical waveguide, no arbitration or contention resolution is required during communication (i.e., the communication is contention free). Furthermore, because multiple integrated circuits 210 can receive any of the carrier wavelengths in an optical waveguide, a switchable-drop-filter-setup control signal is used between the source and destination to tune-on the adjustable band(s) of wavelengths of the appropriate switchable drop filter(s).

As noted previously, because each integrated circuit along the shared data channel may always have the primary-carrier-wavelength switchable drop filter in the ON state, it can receive control messages or control signals from the sending or transmitting integrated circuit. Such a source integrated circuit may first send the control signal to all the affected integrated circuits in the column, using their corresponding primary carrier wavelengths. This control signal may indicate that the switchable drop filters should turn ON and OFF, respectively.

In order to transmit data to a destination using more carrier wavelengths than is allocated to each connection in the default state, a source integrated circuit may perform the following operations: the source integrated circuit may send a switch-setup request (which includes the length of the message) to all the affected integrated circuit in the column; the destination integrated circuit may tune the appropriate switchable drop filters to the ON state and, if necessary to avoid interference with the message, the other integrated circuits in the column may tune their switchable drop filters to the OFF state; then, the source integrated circuit begins data transmission. Note that because the switch-setup request in the first operation may include the packet size, all of the integrated circuits in the column may, therefore, be able to return to the default state at the end of the data transmission.

Using this approach, a source integrated circuit can allocate the bandwidth on a shared channel dynamically between the different destination integrated circuits. For example, integrated circuit 210-1 may communicate with integrated circuit 210-2 using one of two carrier wavelengths (i.e., half the bandwidth of the shared channel) and integrated circuit 210-4 using the other carrier wavelength. In a larger network topology (e.g., 8×8), many different allocations of the carrier wavelengths are possible. One such allocation (which has the same number of carrier wavelengths to each destination) results in a WDM point-to-point network. Hence, this switchable-drop-filter based optical network can result in a reconfigurable point-to-point optical network, where the bandwidth on a shared data channel can be dynamically allocated between simultaneous communication streams to different destination integrated circuits. However, in order to accommodate data reception from multiple integrated circuits without contention, each integrated circuit may be over-provisioned in the number of receivers 218 by a factor of N in an N×N macrochip.

If the 2×2 array in FIG. 2 is scaled to an 8×8 array, and assuming that a WDM factor of eight is used (i.e., each optical waveguide carries eight carrier wavelengths), each integrated circuit, at the receiving end, may have eight switchable drop filters per optical waveguide. Moreover, each integrated circuit may source two optical waveguides or 16 carrier wavelengths per column. If each carrier wavelength has a bit-rate of 20 Gb/s (or 2.5 GB/s), each shared data channel may be 40 GB/s. Therefore, the bandwidth on the 40 GB/s channel can be allocated at a carrier-wavelength granularity between the 8 integrated circuits along a column. The total peak bandwidth of the given integrated circuit is 320 GB/s, and that of the entire optical network is 20 TB/s.

Table 1 provides configuration information in an embodiment of an optical network in an MCM with an 8×8 array. Note that because the light sources are statically tuned, they can output multiple carrier wavelengths at a given time. Moreover, because more than one carrier wavelength can be conveyed in a given optical waveguide, the number of optical waveguides is reduced relative to many other WDM optical networks. Furthermore, the bandwidth in communication between integrated circuits in the optical network can be reconfigured at the granularity of a single carrier wavelength.

TABLE 1

| | |
|---|---|
| Horizontal Optical Waveguides | 1024 |
| Vertical Optical Waveguides | 2048 |
| Transmitters | 8192 |
| Receivers | 65,536 |
| Drop Filters | 0 |
| Switchable Drop Filters | 65,536 |
| Tunable Drop Filters | 0 |
| Arbitration? | No |
| Bounded Clock Skew? | Yes |
| Dark Periods for Tuning? | No |
| Feedback to Tunable Light Sources? | No |
| Bandwidth Reconfigurability | Suitable for fine and large grained reconfigurability |
| Relative Optical Link Power Loss | Mid-range |
| Per Packet Overhead | Minimum |
| Relative Area Overhead | Mid-range |

In summary, MCM 200 includes a contention-free optical network with statically tuned light sources (such as lasers that output a set of fixed carrier wavelengths) and without broadband switches or a global clock. This optical network has: low overhead, low power, high site-to-site bandwidth, and flexible allocation of bandwidth between an integrated circuit and all the integrated circuits in a destination column. The overall complexity of the network topology is not significantly increased relative to existing network topographies, such as a WDM point-to-point optical network. Note that, because the network is contention free and hence requires no arbitration or contention resolution among transmitting integrated circuits, it has low latency and high performance, especially with small messages. While a separate control network may be used to control the switchable drop filters, in some embodiments the control signal(s) are conveyed to the integrated circuits using the same optical waveguides that convey data. Moreover, because the bandwidth along each shared data channel can be dynamically allocated (at carrier-wavelength granularity) between the destination integrated circuits, the network is very flexible and can be adapted to different types of applications. Furthermore, because the network avoids crossings of the optical waveguides, it may be power efficient and may have reduced cross-talk. Additionally, because the network does not require communication with the set of optical sources, the overhead for sending messages may be reduced.

Figure 3:
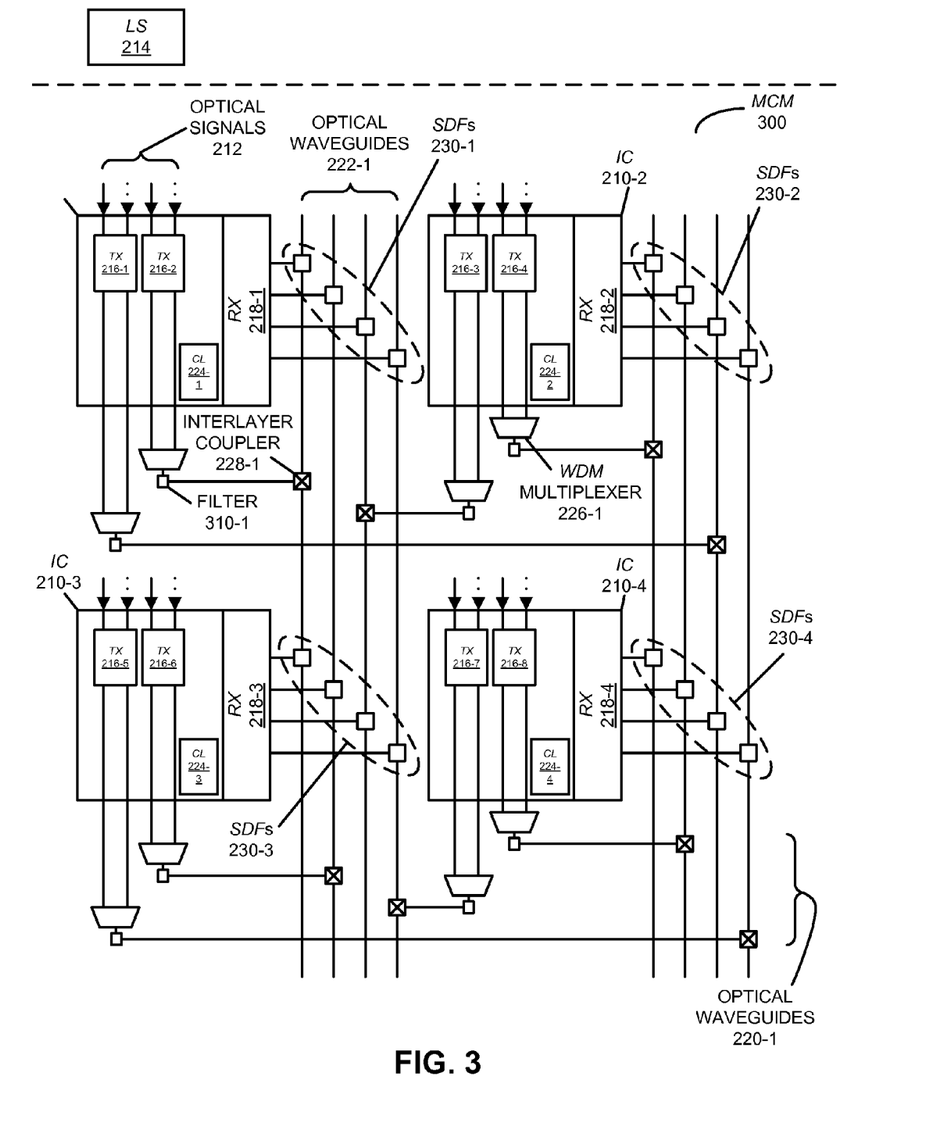
FIG. 3 is a block diagram illustrating optical communication in an MCM in accordance with an embodiment of the present disclosure.

In a variation on the optical network in FIG. 2, the MCM may include: tunable drop filters and/or switchable filters optically coupled to the horizontal optical waveguides and the given integrated circuit. This is shown in FIG. 3, which presents a block diagram illustrating optical communication in MCM 300. In particular, MCM 300 includes filters (such as filter 310-1), which may be tunable drop filters and/or switchable filters. Note that a tunable drop filter passes an adjustable band of wavelengths that includes at least one of the carrier wavelengths. (Thus, a tunable drop filter can be dynamically tuned to any carrier wavelength in the usable spectrum. It will then act exactly as a static drop filter would if tuned for that carrier wavelength.) Moreover, the adjustable bands of wavelengths of the filters may be specified by the control signal provided by control logic 224.

Figure 4:
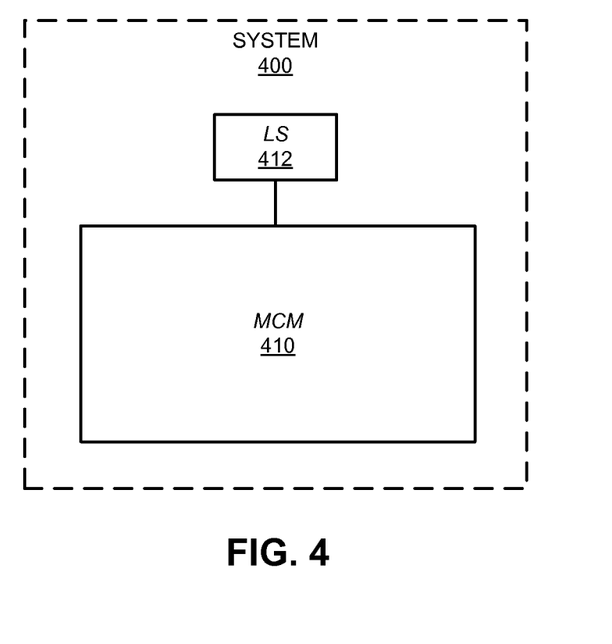
FIG. 4 is a block diagram illustrating a system that includes an MCM in accordance with an embodiment of the present disclosure.

The preceding embodiments of the MCM may be used in a variety of applications. This is shown in FIG. 4, which presents a block diagram illustrating a system 400 that includes an MCM 410 and set of set of statically tuned light sources 412. This set of tunable light sources outputs optical signals having fixed carrier wavelengths.

System 400 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device (such as a tablet computer), a supercomputer, a network-attached-storage (NAS) system, a storage-area-network (SAN) system, and/or another electronic computing device. Note that a given computer system may be at one location or may be distributed over multiple, geographically dispersed locations.

The preceding embodiments of the MCM, as well as system 400, may include fewer components or additional components. Although these embodiments are illustrated as having a number of discrete items, these MCMs and the system are intended to be functional descriptions of the various features that may be present rather than structural schematics of the embodiments described herein. Consequently, in these embodiments two or more components may be combined into a single component, and/or a position of one or more components may be changed. For example, the light sources or lasers may be included on the MCM. In addition, functionality in the preceding embodiments of the MCMs and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular components, configurations and network architectures, a wide variety of additional variations to the optical network in the embodiments of the MCM may be used, as is known to one of skill in the art, including: the use of additional or fewer components, arbitration techniques (as needed), etc.

Figure 5:
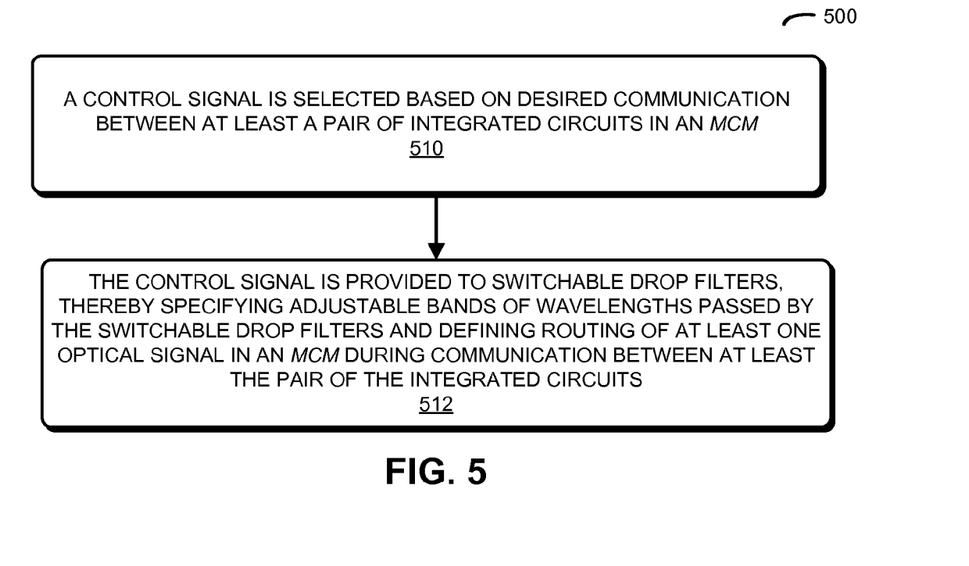
FIG. 5 is a flow chart illustrating a method for routing optical signals in an MCM in accordance with an embodiment of the present disclosure.

We now describe embodiments of a method for routing optical signals. FIG. 5 presents a flow chart illustrating a method 500 for routing optical signals in an MCM, such as one of the preceding embodiments of the MCM. During the method, a control signal is selected based on desired communication between at least the pair of integrated circuits in the MCM (operation 510), which are optically coupled by optical waveguides, where the given integrated circuit modulates at least one of the optical signals when transmitting information to at least another of the integrated circuits and receives at least one modulated optical signal having one of the carrier wavelengths when receiving information from at least the other of the integrated circuits. Then, the control signal is provided to switchable drop filters optically coupled to the optical waveguides and associated integrated circuits (operation 512), thereby specifying adjustable bands of wavelengths passed by the switchable drop filters and defining routing of at least the one of the optical signals in the MCM during communication between at least a pair of the integrated circuits. Note that the switchable drop filters pass adjustable bands of wavelengths to receivers in the integrated circuits.

In some embodiments of method 500, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
integrated circuits configured to receive optical signals from a set of light sources, which have fixed carrier wavelengths, wherein a given integrated circuit includes:
a transmitter configured to modulate at least one of the optical signals when transmitting information to at least another of the integrated circuits; and
a receiver configured to receive at least one modulated optical signal having one of the carrier wavelengths when receiving information from at least the other of the integrated circuits;
first optical waveguides, optically coupled to the integrated circuits, to convey modulated optical signals from transmitters in the integrated circuits;
second optical waveguides, optically coupled to the first optical waveguides, to convey the modulated optical signals;
switchable drop filters optically coupled to the second optical waveguides and associated integrated circuits, wherein the switchable drop filters are configured to pass adjustable bands of wavelengths to receivers in the integrated circuits, and wherein a given adjustable band of wavelengths of a given switchable drop filter associated with the given integrated circuit includes one of: a given carrier wavelength and another wavelength; and
control logic configured to provide a control signal to the switchable drop filters to specify the adjustable bands of wavelengths, thereby defining routing of at least the one of the optical signals in the MCM during communication between at least a pair of the integrated circuits.

2. The MCM of claim 1, wherein the other wavelength includes an unused carrier wavelength.

3. The MCM of claim 1, wherein the integrated circuits are arranged in an array;

wherein the first optical waveguides are optically coupled to rows in the array; and wherein the second optical waveguides are optically coupled to columns in the array.

4. The MCM of claim 1, wherein the first optical waveguides and the second optical waveguides are implemented in different layers on a substrate; and wherein the MCM further includes interlayer couplers that optically couple the first optical waveguides and the second optical waveguides.

5. The MCM of claim 4, wherein the first optical waveguides and the second optical waveguides are implemented on the substrate using silicon-on-insulator technology.

6. The MCM of claim 1, wherein the control signal specifies a number of switchable drop filters associated with the given integrated circuit that have adjustable bands of wavelengths that include carrier wavelengths, thereby specifying a bandwidth during communication between at least the pair of the integrated circuits.

7. The MCM of claim 1, wherein communication between the pair of integrated circuits is contention free.

8. A system, comprising:
a set of light sources configured to output optical signals having fixed carrier wavelengths;
integrated circuits optically coupled to the set of light sources, wherein a given integrated circuit includes:
a transmitter configured to modulate at least one of the optical signals when transmitting information to at least another of the integrated circuits; and
a receiver configured to receive at least one modulated optical signal having one of the carrier wavelengths when receiving information from at least the other of the integrated circuits;
first optical waveguides, optically coupled to the integrated circuits, to convey modulated optical signals from transmitters in the integrated circuits;
second optical waveguides, optically coupled to the first optical waveguides, to convey the modulated optical signals;
switchable drop filters optically coupled to the second optical waveguides and associated integrated circuits, wherein the switchable drop filters are configured to pass adjustable bands of wavelengths to receivers in the integrated circuits, and wherein a given adjustable band of wavelengths of a given switchable drop filter associated with the given integrated circuit includes one of: a given carrier wavelength and another unused carrier wavelength; and
control logic configured to provide a control signal to the switchable drop filters to specify the adjustable bands of wavelengths, thereby defining routing of at least the one of the optical signals in the system during communication between at least a pair of the integrated circuits.

9. The system of claim 8, wherein the integrated circuits are arranged in an array;
wherein the first optical waveguides are optically coupled to rows in the array; and
wherein the second optical waveguides are optically coupled to columns in the array.

10. The system of claim 8, wherein the first optical waveguides and the second optical waveguides are implemented in different layers on a substrate; and
wherein the system further includes interlayer couplers that optically couple the first optical waveguides and the second optical waveguides.

11. The system of claim 10, wherein the first optical waveguides and the second optical waveguides are implemented on the substrate using silicon-on-insulator technology.

12. The system of claim 8, wherein the control signal specifies a number of switchable drop filters associated with the given integrated circuit that have adjustable bands of wavelengths that include carrier wavelengths, thereby specifying a bandwidth during communication between at least the pair of the integrated circuits.

13. The system of claim 8, wherein communication between the pair of integrated circuits is contention free.

14. A method for routing optical signals in an MCM, the method comprising:
using at least one computer to perform operations for:
selecting a control signal based on desired communication between at least a pair of integrated circuits in the MCM, which are optically coupled by optical waveguides, wherein a given integrated circuit modulates at least one of optical signals having carrier wavelengths when transmitting information to at least another of the integrated circuits, and receives at least one modulated optical signal having one of the carrier wavelengths when receiving information from at least the other of the integrated circuits; and
providing the control signal to switchable drop filters optically coupled to the optical waveguides and associated integrated circuits, thereby specifying adjustable bands of wavelengths passed by the switchable drop filters and defining routing of at least the one of the optical signals in the MCM during communication between at least a pair of the integrated circuits,
wherein the switchable drop filters are configured to pass adjustable bands of wavelengths to receivers in the integrated circuits, and
wherein a given adjustable band of wavelengths of a given switchable drop filter includes one of: a given carrier wavelength and another unused carrier wavelength.

15. The method of claim 14, wherein the control signal specifies a number of switchable drop filters associated with the given integrated circuit that have adjustable bands of wavelengths that include carrier wavelengths, thereby specifying a bandwidth during communication between at least the pair of the integrated circuits.

16. The method of claim 14, wherein communication between the pair of integrated circuits is contention free.

17. The method of claim 14, wherein the given integrated circuit receives up to all of the optical signals based on the control signal.

18. The method of claim 14, wherein the integrated circuits are arranged in an array;
wherein first optical waveguides are optically coupled to rows in the array; and
wherein second optical waveguides are optically coupled to columns in the array.

19. The method of claim 14, wherein the optical waveguides are implemented in different layers on a substrate; and
wherein interlayer couplers optically couple the first optical waveguides and the second optical waveguides.

20. The method of claim 14, wherein the optical waveguides are implemented on the substrate using silicon-on-insulator technology.

* * * * *

UNITED STATES PATENT AND TRADEMARK OFFICE
CERTIFICATE OF CORRECTION

| | | |
|---|---|---|
| PATENT NO. | : 8,565,608 B2 | Page 1 of 1 |
| APPLICATION NO. | : 13/180355 | |
| DATED | : October 22, 2013 | |
| INVENTOR(S) | : Pranay Koka et al. | |

It is certified that error appears in the above-identified patent and that said Letters Patent is hereby corrected as shown below:

On the title page item (75), replace the fourth inventor's name "Xuexhe Zheng" with --Xuezhe Zheng--.

Signed and Sealed this
Twenty-fifth Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,565,608 B2 | Page 1 of 1 |
| APPLICATION NO. | : 13/180355 | |
| DATED | : October 22, 2013 | |
| INVENTOR(S) | : Koka et al. | |

It is certified that error appears in the above-identified patent and that said Letters Patent is hereby corrected as shown below:

On title page 2, column 2, under "Other Publications", line 4, delete "Antrease," and insert -- Vantrease, --, therefor.

In the Specification

In column 5, line 38, delete "'blocking'" and insert -- 'blocking'. --, therefor.

Signed and Sealed this
Seventeenth Day of June, 2014

Michelle K. Lee
*Deputy Director of the United States Patent and Trademark Office*